UNITED STATES PATENT OFFICE.

RUDOLF E. HELLMUND, OF PITTSBURGH, AND CHARLES C. WHITTAKER, OF WILKINSBURG, PENNSYLVANIA, ASSIGNORS TO WESTERN ELECTRIC AND MANUFACTURING COMPANY, A CORPORATION OF PENNSYLVANIA.

SYSTEM OF CONTROL.

1,255,418.    Specification of Letters Patent.    Patented Feb. 5, 1918.

Application filed September 21, 1915. Serial No. 51,864.

*To all whom it may concern:*

Be it known that we, RUDOLF E. HELLMUND, a subject of the Emperor of Germany, and a resident of Pittsburgh, in the county of Allegheny and State of Pennsylvania, and CHARLES C. WHITTAKER, a citizen of the United States, and a resident of Wilkinsburg, in the county of Allegheny and State of Pennsylvania, have invented a new and useful Improvement in Systems of Control, of which the following is a specification.

Our invention relates to systems of control, and it has special reference to the control of electric motors that are adapted for the propulsion of vehicles during the accelerating periods thereof.

The object of our invention is to provide a system of the above-indicated character which shall be effective and reliable in operation and which shall include certain automatic safety or emergency features, whereby improper operation of the system is precluded.

More specifically stated, it is an object of our invention to provide a system of control for alternating-current motors of the commutator type wherein over-compensation of a propelling motor under light-load conditions is automatically obviated.

Heretofore, more or less difficulty has been experienced in maintaining proper commutating conditions in some alternating-current motors of the commutator type under relatively light-load conditions, particularly in the case of locomotives where the propelled load may vary from the locomotive itself to a train of several vehicles attached to the locomotive. When the locomotive has been hauling a relatively light load, the exciting field flux, corresponding to the working-circuit current, has been relatively low compared with the compensating field flux, or, in other words, the working-current voltage component of the armature is undesirably low relative to the armature voltage induced by the compensating field winding, by reason of the relatively high-speed operation of the motor under the light-load conditions referred to. In this way, over-compensation has occurred, with the result of poor commutating conditions. In some instances, over-compensation has been so great that the commutating conditions have been worse than they would have been if the compensating field flux were omitted entirely.

According to our present invention, we provide means for manually controlling a system of the class under consideration, combined with automatic means in the form of a limit switch for continuing the operation, if the train operator is so tardy in manually controlling the system that the exciting field flux drops to a value likely to cause poor commutating conditions. The principles of our invention may also be embodied in other types of control systems, all as hereinafter more fully set forth.

In the accompanying drawing.

Figure 1:
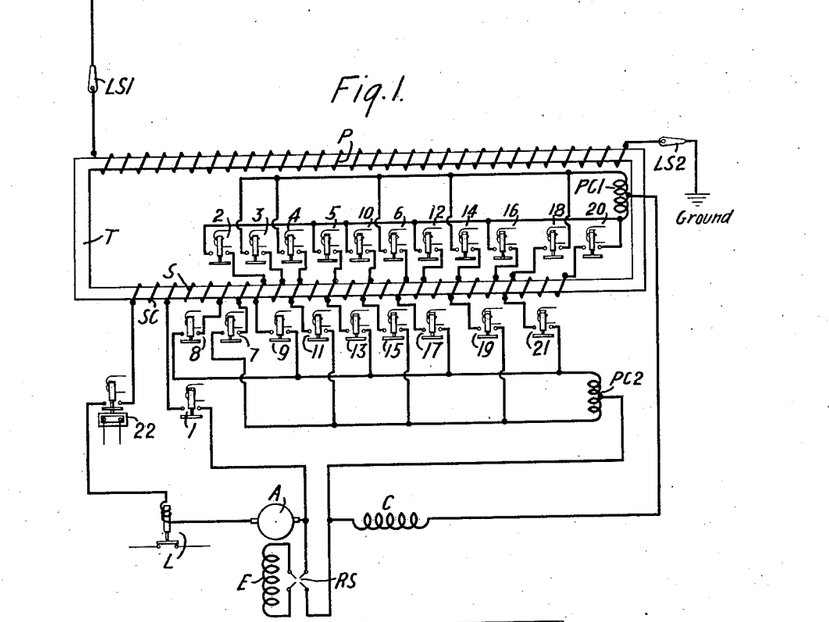
Figure 1 is a view of the main circuits of a system of control embodying our invention.

Referring to Fig. 1, the system shown comprises a plurality of supply-circuit conductors respectively marked Trolley and Ground; a transformer T that is provided with a primary winding P and a secondary winding S; an alternating-current motor of the commutator type having an armature A, a main or exciting field winding E, and an auxiliary commutating or compensating field winding C; a reversing switch RS, preferably of a familiar electrically-controlled type, for reversing the electrical relations of the armature A and the field winding E; a plurality of switches 1 to 22, inclusive, for manipulating the motor circuits in accordance with the desired sequence; a plurality of preventive coils PC1 and PC2 that are employed in connection with the manipulation of the switches according to a familiar practice; a plurality of primary-circuit switches LS1 and LS2 for connecting the primary winding P of the transformer to the supply-circuit conductors; and a limit switch L of a familiar type that has its actuating coil disposed in series-circuit relation with the main armature A.

The armature A is initially adapted to be short-circuited by a relatively small portion SC of the secondary winding S, the motor thus starting as a repulsion motor, while the main field winding E and the compensating field winding C are initially connected in series-circuit relation across another predetermined portion of the winding S. The short-circuit of the armature A is then removed, the main field winding E is connected in series-circuit relation with the armature A, and the compensating field winding C is connected across a certain portion of the transformer winding S, whereby the well-known doubly-fed connection of the propelling motor is obtained. The various motor-circuit switches are then manipulated in accordance with the desired sequence to gradually increase the voltage that is impressed upon the armature and main field winding, or working-circuit, while the voltage impressed upon the compensating winding C, or commutating circuit, is gradually reduced as the main field excitation increases, the preventive coils PC1 and PC2 being adapted to prevent undesirable surges of current during the transition of connections from one switch to another, as will be understood.

Figure 3:
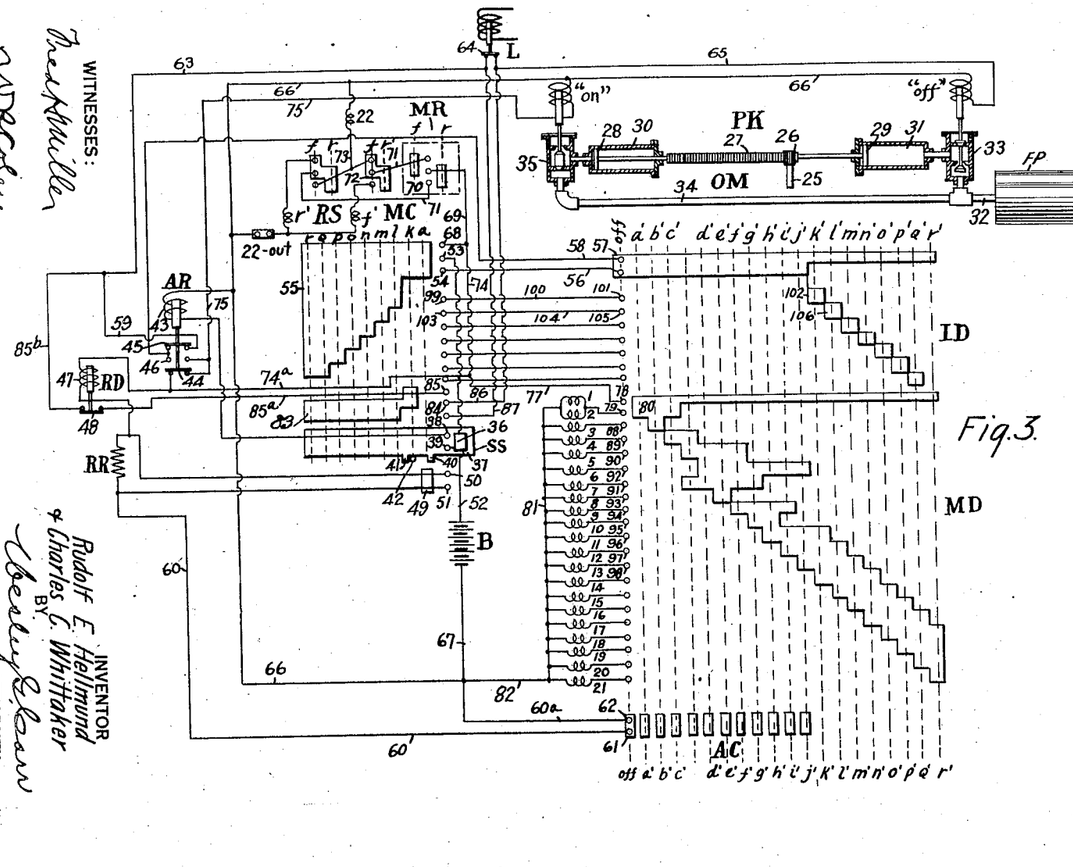
Fig. 3 is a diagrammatic view of an auxiliary governing system for manipulating the various motor-circuit switches in accordance with the sequence chart.

Reference may now be had to Fig. 3, wherein the auxiliary governing system shown comprises the actuating coils for the various motor-circuit switches; an electrically-controlled, pneumatically-operated switching device or controller PK that is adapted to occupy a plurality of operative positions $a'$ to $r'$, inclusive, for energizing the various actuating coils in accordance with the desired sequence; a master controller MC that has its initial position $a$ corresponding to the group of the first 10 positions $a'$ to $j'$, inclusive, of the controller PK and has its subsequent positions $k$ to $r$ corresponding to the subsequent positions $k'$ to $r'$, respectively, of the controller PK; a master reverser MR that is associated with the master controller MC and the actuating coils of the main reverser RS in accordance with customary practice; a battery B or other suitable source of energy for energizing the various switch-actuating coils; the auxiliary contact members of the limit switch L; a relay device RD that is associated, in a manner to be described, with the limit switch L and with a plurality of contact segments AC that respectively correspond to positions "Off" to $j'$, inclusive, of the controller PK; and an auxiliary relay AR that is associated with the actuating coils of the controller PK and with a slip segment SS disposed upon the master controller MC, as hereinafter more fully set forth.

The customary relatively complicated electrical interlocking of the various switches that are connected to the secondary transformer winding, to prevent improper sequence of operation, has been omitted for the sake of simplicity and clearness. However, it will be understood that such interlocking is preferably employed in connection with our invention.

An operating mechanism OM for the controller PK comprises a shaft 25 that is associated with the controller to impart a rotative movement thereto; a pinion 26 that is disposed near the upper end of the shaft 25 and is adapted to mesh with a rack member 27, the opposite ends of which are respectively provided with a plurality of pistons 28 and 29; and a plurality of suitable operating cylinders 30 and 31 for the pistons 28 and 29 that are associated with valve members 33 and 35, respectively, which are provided with suitable operating coils or electro-magnets respectively marked "Off" and "On". A suitable fluid-pressure tank or reservoir FP is connected to the valve 33 by means of a suitable pipe or passage 32, and a continuatiton 34 of the pipe 32 communicates with the other valve 35.

The valve 35 is closed, when the associated electro-magnet "On" is deënergized, to prevent the admission of fluid pressure to the corresponding cylinder 30, while the valve 33 is of the inverted type, being adapted to admit fluid pressure to the operating cylinder 31 whenever the corresponding actuating coil "Off" is deënergized. The controller PK is thus biased to its "off" position, as shown in the drawing.

To effect the step-by-step operation of the controller PK, the actuating coils "On" and "Off" are suitably energized, whereby fluid pressure is exhausted through the closed valve 33, while fluid pressure is admitted through the opened valve 35 to the operating cylinder 30, and the controller is successively moved through its various positions. To arrest the movement of the controller at any desired point, the "off" magnet may be deënergized, whereby balanced-pressure conditions in the cylinders 30 and 31 immediately obtain and the controller is positively and immediately brought to rest in the desired position. Such arresting of the controller movement is effected during operation through the group of initial positions $a'$ to $j'$, inclusive, through the agency of the contact segments AC, as set forth later. For preventing the controller from making more than one step at a time during the purely manual control thereof (positions k' to r', inclusive), contact segments are disposed upon an interlocking drum ID that is rotatable with the main drum MD of the controller to deënergize the "off" magnet valve at the proper time to prevent the controller PK from passing beyond a predetermined condition, as hereinafter more fully described. To return the PK controller to its "off" position, it is merely necessary to deenergize both the "off" and the "on" magnets, whereupon fluid pressure is released from the cylinder 30 and is admitted to the cylinder 31 to actuate the controller to the position illustrated.

The slip segment SS comprises a contact member 36 that is disposed upon a suitable band or ring 37 of insulating material that frictionally engages the main body of the controller MC; and a plurality of control fingers 38 and 39 that are adapted to engage the contact member 36 under conditions to be described. The band or ring 37 is shown as provided with a plurality of projections or lugs 40 and 41 that are disposed a distance apart corresponding to the distance between two consecutive notches of the master controller, and a projection or arm 42 that is suitably associated with the stationary portion of the master controller (not shown) is adapted to engage the one or the other of the lugs 40 and 41 under predetermined conditions.

The operation of the slip segment may be set forth as follows: during the forward movement of the master controller, the arm 42 engages the lug 41 as shown in the drawing, whereby the body of the master controller drum rotates within the band or ring 37 and no movement of the band occurs. However, as soon as the master controller is moved backwardly, the frictional engagement of the band 37 with the body of the master controller immediately effects the movement of the slip segment to a position wherein the control fingers 38 and 39 bridge the contact member 36 to complete certain circuits, as described later. Movement of the contact member 36 beyond the control fingers 38 and 39 is prevented by reason of the arm 42 engaging the lug 40 of the slip segment.

The auxiliary relay AR is provided with an actuating coil 43 that is connected in series-circuit relation with the contact member 36 of the slip segment across the battery B, whereby the auxiliary relay is raised to its upper position whenever the master controller is returned toward its "off" position, for a purpose set forth later. When the auxiliary relay occupies its deënergized or lower position shown in the drawing, two sets of connections are effected, one including a movable contact member 44 of the relay which is disposed in circuit with the "on" magnet, and the other set including a movable contact member 45 which is disposed in circuit with the "off" magnet of the controller. When the relay is actuated to its upper position, the movable contact member 44 bridges a pair of stationary contact members 46 to complete a circuit that is later traced in detail.

The relay device RD is provided with an actuating coil 47 that is disposed in series-circuit relation with the contact members AC of the controller PK and with a permanent resistor RR that is adapted to be short-circuited by a circuit including contact member 49 and control fingers 50 and 51 of the master controller whenever the controller occupies its position a.

Assuming that the switches LS1 and LS2 are closed, that the main reversing switch RS and the master reverser MR occupy their forward operating positions, and that the master controller MC is actuated to its initial operative position a, which corresponds to positions a' to j', inclusive, of the controller PK, the operation of the system may be set forth as follows: a circuit is first established from one terminal of the battery B through conductor 52, control fingers 53 and 54, which are bridged by contact segment 55 of the master controller, conductor 56, contact segment 57 of the interlocking drum ID in the "off" position of the PK controller, conductor 58, the auxiliary contact member 45 of the auxiliary relay AR, conductors 59 and 63, auxiliary contact members 64 of the limit switch L in its lower position, conductor 65, the "off" magnet of the controller PK, and conductors 66 and 67 to the negative terminal of the battery B.

Another circuit is simultaneously established from the contact segment 55 of the master controller through control finger 68, conductor 69, contact member 70 of the master reverser in its forward position, conductor 71, contact member 72 of the main reversing switch RS in its forward position, conductor 73 and the actuating coil of the switch 22 to the negative conductor 66.

A further circuit is established at this time from conductor 69, through conductors 74 and 74ª, contact member 44 of the auxiliary relay AR, conductor 75 and the "on" magnet of the PK controller to conductor 66.

A still further circuit is established from conductor 74, through conductor 77, control fingers 78 and 79 which are bridged by contact segment 80 of the main drum MD of the controller PK in position a' thereof, the parallel-connected actuating coils of the switches 1 and 2 and conductors 81 and 82 to the negative conductor 67. The switch 22 is thus closed, the PK controller is actuated by reason of the energization of both its actuating coils, and the switches 1 and 2 are closed as soon as the controller reaches its position $a'$, whereby the motor is started into operation as a repulsion motor.

Provided the train operator properly manipulates the master controller MC in the manner about to be described, the main motor or motors will be subsequently supplied with a sufficiently high value of working-circuit current to prevent the over-compensation of the motor that has already been referred to. However, in case the manipulation of the master controller is tardy, under relatively light load conditions on the locomotive, the energization of the "off" magnet of the PK controller occurs intermittently, in accordance with the operation of the limit switch L, each time that the current traversing the main armature A decreases to an undesirably low value, and the controller PK is actuated step-by-step toward its final "initial group" position $j'$. However, the operation of the limit switch L is primarily and entirely designed to effect the emergency operation just recited, and the switch is never brought into use, provided the master controlled MC is manipulated properly. Under relatively heavy-load conditions, the limit switch remains in its open position, and the operation is manually continued, as set forth below.

The above-mentioned proper manipulation of the master controller comprises first, an actuation thereof from the initial position $a$ to the subsequent position $k$, and then a return to the initial position $a$, whereby the controller PK is moved forward one step. As soon as the master controller occupies its second position $k$, a contact segment 83 bridges a pair of control fingers 84 and 85, whence circuit is completed from the auxiliary contact members 64 of the limit switch L, through conductor 86, control fingers 84 and 85, contact segment 83, conductor $85^a$, auxiliary contact members 48 of the relay device RD in its upper or closed position, conductors $85^b$ and 63, to the limit switch contact members 64, thus bridging the stationary contact members and permitting the energization of the "off" magnet of the PK controller to effect a forward movement thereof, irrespective of the position of the limit switch L.

The undesirably rapid movement of the controller PK through a number of steps is prevented by reason of the operation of the relay device RD in conjunction with the resistor RR and the contact segments AC of the controller. The actuating coil 47 of the relay device RD is initially energized from the positive conductor $74^a$, circuit being completed through the resistor RR, conductor 60, control fingers 61 and 62, which are bridged by the initial contact segment AC, and conductor $60^a$ to negative conductor 67. The proportions of the actuating coil 47 of the relay device RD are such that the device can be raised to its upper or closed position only when the resistor RR is short-circuited but can be maintained in its closed position even when the resistor is included in circuit. Consequently, when the master controller is moved to its position $k$, the short-circuit of the resistor RR is removed by reason of the disengagement of the contact member 49 and the control fingers 50 and 51, but the relay device RD remains in its closed position as long as the control fingers 61 and 62 engage the initial contact segment AC.

In passing from the "off" position to the initial operative positon of the controller PK, the control fingers 61 and 62 are momentarily open-circuited, whereby the relay device RD drops to its lower position, and the circuit of the "off" magnet of the PK controller is deënergized to stop the controller in its position $a'$. Thus, the master controller MC must be returned to its initial position $a$, whereby the resistor RR is again short-circuited, before the relay device RD can be raised to its closed position to permit further energization of the "off" magnet. A similar manipulation of the master controller and the corresponding operation of the relay device RD occurs to effect the forward movement of the PK controller through its last "initial group" position $j'$, the limit switch L becoming effective only in case the train operator is tardy in his manipulation of the master controller to such a degree that the working-current of the main motor decreases to a value that is detrimental to the commutating conditions of the motor.

The main-circuit connections that are established during the operation of the controller PK through positions $a'$ to $j'$, inclusive, will now be traced. In position $b'$ of the controller PK, control finger 88 engages the contact segment 80 of the main drum MD, thereby energizing the actuating coil of the switch 3, to impress a predetermined increase of voltage upon the circuit including the two field windings E and C of the propelling motor. In position $c'$ of the controller PK, the switch 3 is opened, while the control finger 89 engages contact segment 80 and the switch 4 is closed to still further increase the voltage impressed upon the field-winding circuit. In the transition position disposed intermediate the operating positions $c'$ and $d'$ of the controller PK, the switches 1 and 2 are opened, and control fingers 90 and 91 engage contact segment 80, whereby the switches 5 and 7 are closed. The repulsion-motor connection is thus removed and the propelling motor is connected up as a doubly-fed motor, with the armature A and the exciting field winding E included in the working circuit, and the compensating field winding C included in the other circuit.

In position $d'$, control finger 92 engages the contact segment 80, whereby the switch 6 is closed to suitably vary the voltage impressed upon the compensating field winding C.

In position $e'$, a control finger 93 engages the contact segment 80 to effect the closure of the switch 8, while, in position $f'$, control finger 94 engages control finger 80, and switch 9 is closed, whereas the switch 8 is opened.

Similar manipulation of the motor-circuit switches in accordance with a customary practice subsequently ensues, the switch 10 being closed in position $g'$ of the controller, while, in positions $h'$ and $i'$ thereof, the switch 11 is closed while the switch 7 is opened and the switch 12 is closed while the switch 10 is opened.

In the last "initial group" position $j'$, the switch 13 is closed and the switch 9 is concurrently opened.

When the controller PK has been actuated through position $j'$ to the initial exclusively manually governed control position $k'$ by the above-described manipulation of the master controller MC or by the emergency operation of the limit switch L, the connection between conductor 56 and contact segment 57 is broken to deënergize the "off" actuating coil and arrest the controller movement. Actuation of the master controller to position 1, establishes a circuit from the contact segment 55 of the master controller through control finger 99, conductor 100, control finger 101 of the controller PK, contact segments 102 and 57 thereof, and thence through conductor 58 to the "off" magnet of the controller PK in the manner already described, the stationary contact members 64 of the limit switch L being from this time on bridged by a circuit including conductors 86 and 87 and the contact segment 83. The contact segment 102 of the interlock drum ID disengages the control finger 101 a predetermined time after the controller leaves its position $k'$, whereby the "off" magnet is deënergized and the controller is positively and effectively brought to rest exactly in the position $l'$. A similar operation occurs when the master controller is moved to its fourth operative position $m'$, whereby a circuit is established from the contact segment 55, through control finger 103, conductor 104, and control finger 105 and contact segment 106 of the interlocking drum ID to again effect the energization of the "off" magnet. The contact of the segment 106 and the finger 105 is broken in a manner similar to that already described to effect the desired movement to the position $m'$ of the controller PK.

To effect the further operation of the controller PK, the master controller MC is successively moved through its steps $n$ to $r$, inclusive, in accordance with service conditions, and the step-by-step movement of the controller PK is effected in a manner similar to that just set forth.

Figure 2:
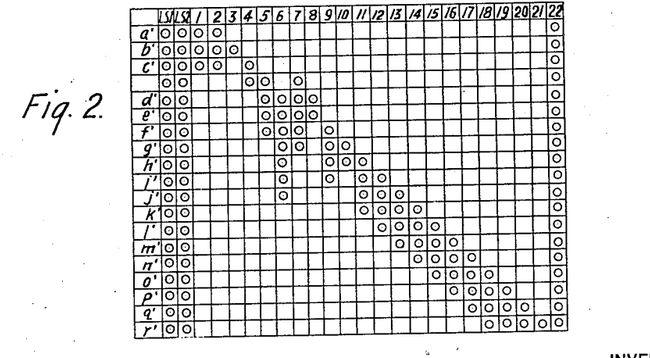
Fig. 2 is a sequence chart of well-known form, indicating the sequence of operation of the various motor-circuit switches that are illustrated in Fig. 1.

Inasmuch as the relative current conditions in the working-circuit and in the compensating circuit during the latter half of the operation of the PK controller are such that the danger of over-compensation is obviated, the use of the emergency limit switch L is no longer required and the operation of the PK controller is purely under manual control. The manipulation of the motor-circuit switches during the operation of the controller PK from position $k'$ to position $r'$, inclusive, comprises merely the successive closure of certain switches and the concurrent successive opening of others that have been previously closed, as indicated in the sequence chart of Fig. 2, and no further description of this familiar operation is believed to be necessary.

When the master controller is returned to its "off" position, the slip segment SS is actuated as hereinbefore described to effect the actuation of the auxiliary relay AR to its upper position. The "off" magnet is thus deënergized, but a new energizing circuit for the "on" magnet includes the master controller segment 55, the contact segment 57 of the controller PK, contact members 44 and 46 of the relay AR, and conductors 75 and 66. Consequently, the controller PK is not actuated backwardly until the master controller reaches its "off" position, so that there is no possibility of interrupting the circuit and creating a damaging arc on the controller PK.

Figure 4:
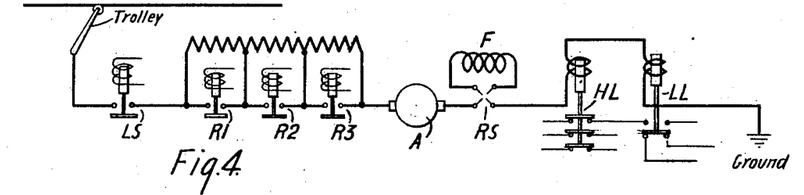
Fig. 4 is a diagrammatic view of the main circuits of a modification of my invention.

Reference may now be had to the modified main-circuit connections that are shown in Fig. 4, wherein the system illustrated comprises the supply-circuit conductors Trolley and Ground; a dynamo-electric machine having an armature A and a series-type field-magnet winding F; the reversing switch RS for the usual purpose; a main-circuit switch LS; an accelerating resistor, the sections of which are respectively adapted to be short-circuited by switches R1, R2, and R3; and a plurality of limit switches HL and LL. The limit switch HL is adapted to operate under conditions of relatively high current through the armature A to prevent further operation of the system, as described in detail later in connection with Fig. 6, and the other limit switch LL is adapted to continue the operation of the system when the armature current reaches a relatively low value in accordance with the familiar operation of limit switches, under predetermined conditions to be described.

Figure 5:
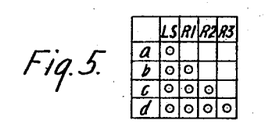
Figs. 5 and 6 are views that correspond respectively to Figs. 2 and 3, taken in connection with the system that is illustrated in Fig. 4.
Figure 6:
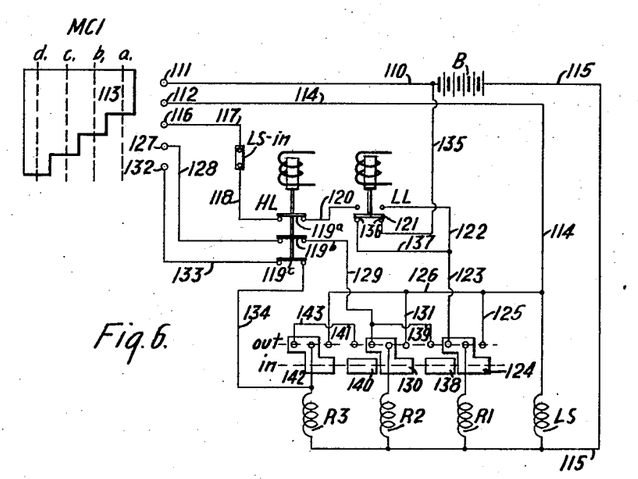
Figure 7:
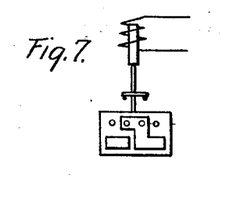
Fig. 7 is a diagrammatic view of a switch.

The auxiliary governing system shown in Fig. 6 comprises the actuating coils of the switches LS, R1, R2 and R3, a plurality of interlocking contact members of a familiar type that are associated with, and adapted to be actuated by, the corresponding main-circuit switches, in accordance with the well-known construction illustrated in Fig. 7; the auxiliary contact members of the high-current and low-current limit switches HL and LL, respectively; a master controller MC1 that is adapted to occupy a plurality of positions $a$ to $d$, inclusive; and a suitable source of energy, such as the battery B, for energizing the various actuating coils through the master controller in accordance with the sequence chart of Fig. 5. The customary master reverser that is employed in connection with the master controller and the main-circuit reversing switch in accordance with the arrangement illustrated in Fig. 3, has been omitted in Fig. 6 for the sake of simplicity and clearness. However, it will be understood that such a master reverser is normally employed in the system to be described.

Assuming that the master controller is moved through its successive positions in a proper manner by the train operator so that the manipulation of the controller is neither so tardy that the limit switch LL is allowed to drop to continue the operation of the system, nor is the manipulation of the controller so premature that the excessive motor current effects the raising of the high-current limit switch HL to prevent further operation of the system, such operation may be described as follows:

A circuit is first established from the positive terminal of the battery B, through conductor 110, control fingers 111 and 112, which are bridged by contact segment 113 of the master controller MC1, conductor 114, the actuating coil of the switch LS and conductor 115 to the negative terminal of the battery B. The motor is thus connected to the supply circuit in series relation with the entire accelerating resistor.

If the master controller MC1 is then moved to its position $b$ at the proper time, so that neither the high-current nor the low-current limit switches HL and LL, respectively, are actuated, a circuit is completed from the contact segment 113 of the master controller, through control finger 116, conductor 117, interlock LS—in, conductor 118, a movable upper contact member 119ª of the high-current limit switch HL in its lower position, conductor 120, auxiliary contact member 121 of the low-current limit switch LL in its upper position, conductors 122 and 123, interlock 124—R1—out, and the actuating coil of the switch R1 to the negative conductor 115. The switch R1 is held in, upon its closure, by reason of the formation of a suitable holding circuit comprising interlock 124—R1—in and conductors 125, 126 and 114.

If the master controller is then properly manipulated to position $c$, a circuit is established from the contact segment 113, through control finger 127, conductor 128, the intermediate movable contact member 119ᵇ of the limit switch HL, conductor 129, interlock 130—R2—out and the actuating coil of the switch R2 to conductor 115. As soon as the switch R2 is closed, the circuit of its actuating coil is transferred through interlock 130—R2—in and conductor 131 to conductor 126.

Upon actuation of the master controller to its final position $d$ at the proper time, a circuit is established from the contact segment 113, through control finger 132, conductor 133, the lower contact member 119ᶜ of the limit switch HL in its lower position, conductor 134 and the actuating coil of the switch R3 to conductor 115, whereby the accelerating resistor is entirely short-circuited.

If it be assumed, however, that the master controller is moved to its initial position $a$ and is allowed to remain in that position for too long a time, so that the accelerating current drops to an undesirably low value, then the low-current limit switch LL will drop to its lower position, whereby a circuit is completed from the positive terminal of the battery B, through conductor 135, the contact member 121 of the limit switch LL which bridges a pair of stationary contact members 136 when occupying its lower position, and conductors 137 and 123 through the actuating coil of the switch R1, in accordance with the circuit already traced. After the closure of the switch R1, provided the master controller is not manipulated to a subsequent position so that the low-current limit switch LL again drops to its lower position, a circuit is completed from conductor 123 through interlock 138—R1—in, conductor 139 and the interlock 130 to the actuating coil of the switch R2.

Similarly, if the limit switch LL again drops to its lower position, while the master controller remains stationary or is manipulated in a tardy manner, a circuit is completed from conductor 139, through interlock 140—R2—in, conductor 141, interlock 142—R3—out and the actuating coil of the switch R3. Upon the closure of the switch R3, a holding circuit for its actuating coil is formed including interlock 142—R3—in and conductor 143 which is connected to conductor 126.

From the foregoing description, it will be understood that should the master controller be properly operated through a certain portion of its positions and then improperly manipulated for the remainder of the time, such as too long a delay in any position, the low-current limit switch LL will effect the continuation of the operation of the system from any point as soon as the accelerating current decreases to a predetermined value. It will be observed that, in the system just described, it is possible for the low-current limit switch to effect system connections which correspond to subsequent positions of the master controller, irrespective of the position thereof at the time.

Should the accelerating current become excessive at any time during either the purely manual or the automatic operation above described, the high-current limit switch HL will be raised to break the connections between the several pairs of conductors 118 and 120, 128 and 129, and 133 and 134, thereby preventing further operation of the system, irrespective of whatever connections have already been made at the time excessive current occurs. For example, if the switch R1 has been closed and the holding circuit for its actuating coil established so that the interruption of the connections between conductors 118 and 120 has no effect upon the energization of the coil, the circuit of the actuating coil of the switch R2 is opened at the auxiliary contact member 119$^b$ of the high-current limit switch and the operation of the system can proceed no further until the limit switch HL has again dropped to its lower position.

In this way, provided the train operator properly manipulates the master controller MC1, neither of the limit switches will be operated, and a purely manually controlled system is the result. However, in case of improper manipulation, that is, if the master controller is moved either too slowly or too rapidly through its successive operating positions, the one or the other of the limit switches acts to either effect the continuation of the system above a predetermined rate or to entirely prevent further operation of the system at too rapid a rate, as the case may be.

We do not wish to be restricted to the specific circuit connections or arrangement of parts herein set forth, as various modifications thereof may be made within the spirit and scope of our invention. We desire, therefore, that only such limitations shall be imposed as are indicated in the appended claims.

We claim as our invention:

1. In a control system, the combination with a dynamo-electric machine, of means for manually governing the operation thereof, and means for automatically continuing the government of said machine under predetermined improper manipulation of said manual means.

2. In a control system, the combination with a dynamo-electric machine, of means for manually governing the operation thereof, and current-controlled means for automatically continuing the government of said machine under tardy manipulation of said manual means.

3. In a control system, the combination with a dynamo-electric machine having an armature and a field-magnet winding, of a switching device for manually governing the acceleration thereof, and means dependent upon the tardy manipulation of said switching device and for effecting further acceleration of said machine.

4. In a control system, the combination with a dynamo-electric machine having an armature and a field-magnet winding, of a manually operated controller for establishing a certain sequence of circuits for governing the acceleration of the machine, and a limit switch having its actuating coil connected in circuit with the armature, said limit switch being adapted to effect circuit connections for continuing the acceleration of said motor in accordance with said sequence of circuits under tardy operation of the controller accompanied by relatively low armature current.

5. In a control system, the combination with a dynamo-electric machine having an armature and a field-magnet winding, of means for manually governing the operation of said machine, means for automatically continuing the government of said machine under tardy manipulation of said manual means, and other means for automatically and temporarily arresting the government of said machine under predetermined premature manipulation of said manual means.

6. In a control system, the combination with a dynamo-electric machine having an armature and a field-magnet winding, of a multi-position controller for manually governing the acceleration of said machine, an armature-current-controlled switch adapted to effect circuit connections for continuing said acceleration under tardy operation of the controller accompanied by relatively low armature current, and a second armature-current-controlled switch adapted to prevent further circuit connections for temporarily arresting said acceleration under predetermined premature manipulation of the controller accompanied by relatively high armature current.

7. In a control system, the combination with a supply circuit and an electric motor, of a manually-operated multi-position controller for effecting acceleration of said motor from said supply circuit, and a limit switch controlled by the armature current of the motor for automatically establishing motor-circuit connections corresponding to subsequent positions of said controller.

8. In a system of control, the combination with an energized transformer winding and an alternating-current motor, of circuit connections with said transformer winding for effecting the complete acceleration of said motor, manually-controlled step-by-step means for establishing said circuit connections, and means controlled by the armature current for automatically establishing said connections at a rate independent of the rate of movement of said manually-controlled means.

9. In a system of control, the combination with a source of electrical energy, and an electric motor, of a plurality of switches for effecting connections to said source of energy for accelerating said motor, a plurality of actuating coils for said switches, a manually-operated master controller adapted to assume a plurality of positions for energizing said coils in a predetermined sequence, and a limit switch adapted to automatically energize said coils in the desired sequence, said limit switch being ineffectve when the master controller is operated at a predetermined rate through certain positions.

10. In a system of control, the combination with a dynamo-electric machine having an armature and a field-magnet winding, of a step-by-step main switching device for controlling the machine operation, a step-by-step master switching device for governing the main switching device, and current-controlled means for effecting the operation of said main switching device under conditions of improper manipulation of said master switching device.

11. In a system of control, the combination with a dynamo-electric machine having an armature and a field-magnet winding, of a step-by-step main switching device for controlling the machine operation, a pair of electro-magnets for governing the actuation of said switching device, a step-by-step master controller for effecting energization of said electro-magnets in accordance with a predetermined sequence, and a limit switch for effecting said energization under conditions of tardy manipulation of said master controller.

12. In a system of control, the combination with a dynamo-electric machine having an armature and a field-magnet winding, of a step-by-step switching device for controlling the machine operation, a pair of electro-magnets for governing the actuation of said switching device, a step-by-step master controller having one position corresponding to a group of positions of said switching device and having other positions that respectively correspond to the other positions of the switching device, and a limit switch adapted to effect energization of one of said electro-magnets to move the switching device through only said group of positions under predetermined conditions, whereby if said limit switch is inoperative under relatively heavy-load conditions, the switching device may be moved by actuating the master controller to one of said other positions.

13. In a system of control, the combination with a dynamo-electric machine having an armature and a dynamo-electric machine having an armature and a field-magnet winding, of a step-by-step switching device for controlling the machine operation, a pair of electro-magnets for governing the actuation of said switching device, a step-by-step master controller having its initial position corresponding to an initial group of positions of said switching device and having its subsequent positions respectively corresponding to the subsequent positions of the switching device, a limit switch actuated by the main armature current and adapted to intermittently effect energization of one of said electro-magnets to move the switching device through only said group of positions, a relay device having its contact members connected in series-circuit relation with the contact members of the limit switch, and means respectively associated with the master controller and with the switching device for closing said relay device only when the switching device occupies any of said group of positions simultaneously with the occupation of its initial position by the master controller, whereby, if said limit switch contact members remain disconnected under relatively heavy armature current conditions, the switching device may be moved in a step-by-step manner by actuating the master controller to a subsequent position, returning it to its initial position to effect the closure of said relay device, and again actuating the controller to said subsequent position.

14. In a control system, the combination with a dynamo-electric machine, of means for manually governing the operation thereof, and means independent of said governing means and dependent upon abnormal circuit conditions for momentarily maintaining the motor circuits unchanged by said governing means during the presence of such abnormal circuit conditions.

In testimony whereof, we have hereunto subscribed our names this 31st day of August, 1915.

RUDOLF E. HELLMUND.
CHARLES C. WHITTAKER.